United States Patent [19]
Duthion et al.

[11] 3,949,784
[45] Apr. 13, 1976

[54] AIR CUSHION VEHICLE FLUID FLOW SYSTEM

[75] Inventors: Louis Duthion, Paris; Alain Verneau, Trappes, both of France

[73] Assignee: Bertin & Cie, Plaisir, France

[22] Filed: Nov. 29, 1973

[21] Appl. No.: 420,299

[30] Foreign Application Priority Data
Nov. 29, 1972  France .............................. 72.42385

[52] U.S. Cl. ................. 137/608; 180/121; 180/125
[51] Int. Cl.² ...................... B60V 1/00; B60V 1/11
[58] Field of Search ........ 180/121, 125; 137/561 A, 137/608; 417/440

[56] References Cited
UNITED STATES PATENTS

| | | | |
|---|---|---|---|
| 2,059,255 | 11/1936 | Lassit............................. | 137/561 A |
| 3,191,706 | 6/1965 | Petersen .......................... | 180/125 |
| 3,200,898 | 8/1965 | Dobbertien....................... | 180/125 |
| 3,263,764 | 8/1966 | Bertin.............................. | 180/121 |
| 3,414,076 | 12/1966 | Bertin et al...................... | 180/121 X |

*Primary Examiner*—Carlton R. Croyle
*Assistant Examiner*—Richard E. Gluck
*Attorney, Agent, or Firm*—A. W. Breiner

[57] ABSTRACT

In and for an installation comprising a fluid source and a plurality of fluid-using receivers to be fed with fluid from said source, a device for supplying fluid from said source to said receivers independently of one another, said device comprising a fluid manifold connected with said fluid source and branching out into a plurality of fluid emission nozzles having each an outlet opening, and a plurality of fluid-receiving pipes each of which is connected with a corresponding receiver and has an inlet opening located in line with and spaced by a gap from the outlet opening of a corresponding emission nozzle, the cross-sectional area of said inlet opening of a receiving pipe being at the very most equal to the cross-sectional area of said outlet opening of said corresponding emission nozzle.

9 Claims, 8 Drawing Figures

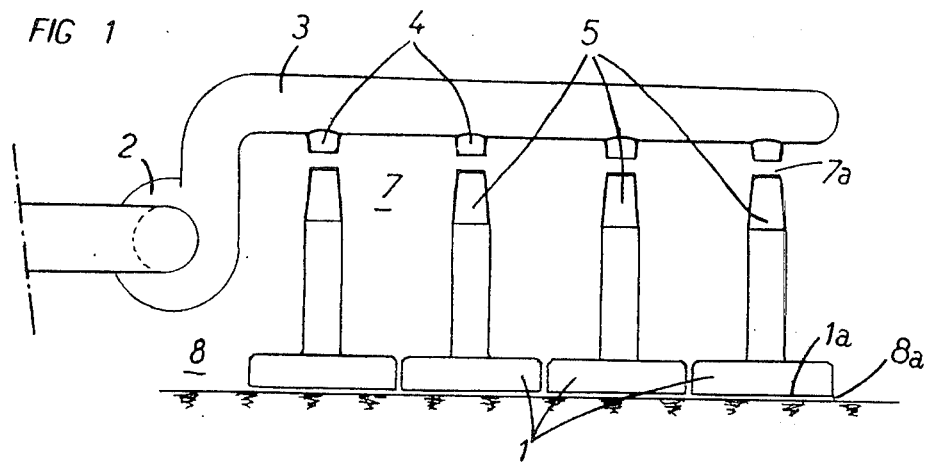
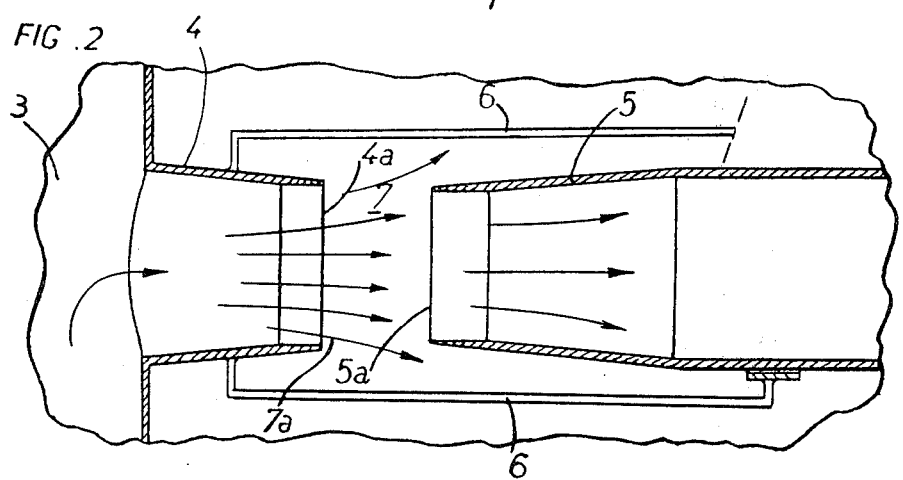
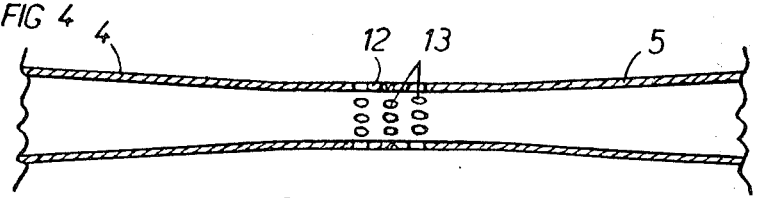
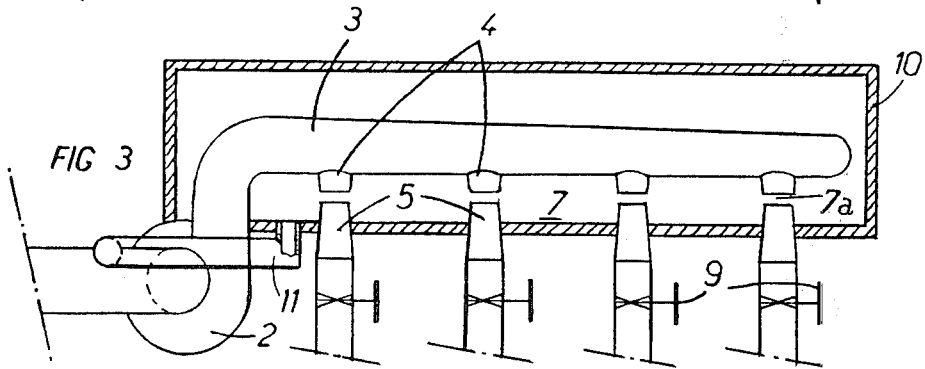

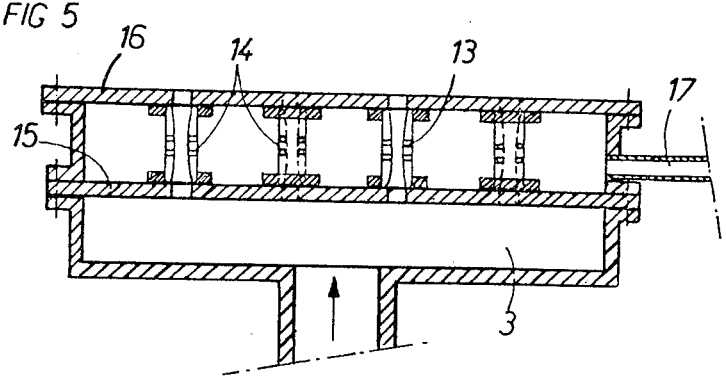
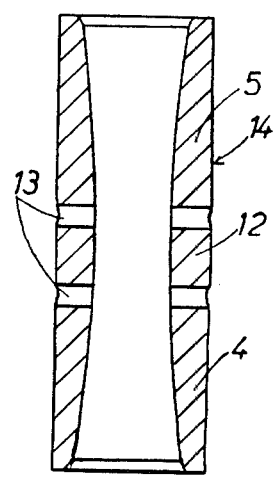
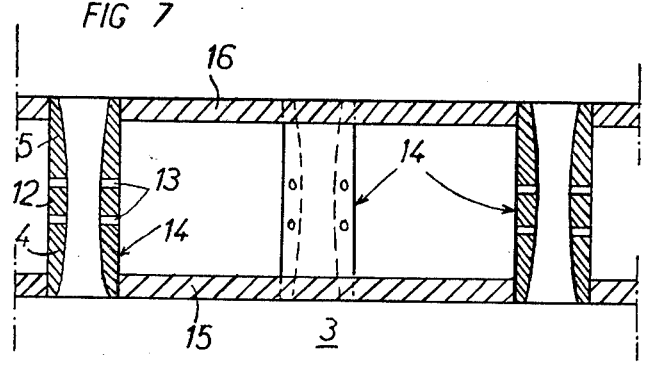
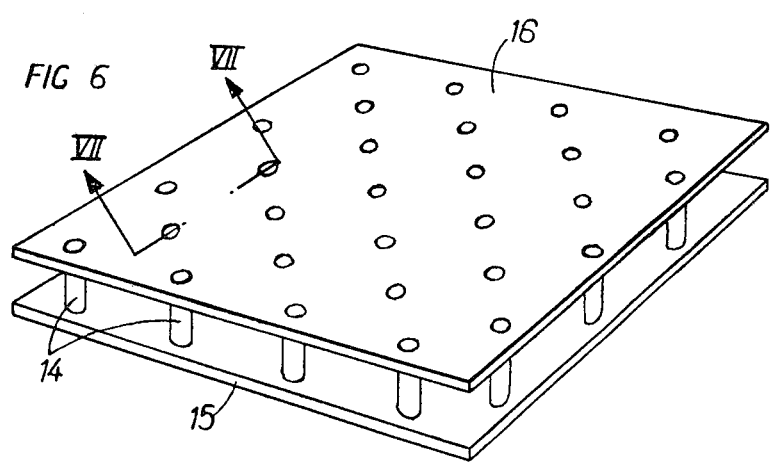

AIR CUSHION VEHICLE FLUID FLOW SYSTEM

The present invention relates to a fluid supply device for supplying a plurality of fluid-using appliances or "receivers" such as pressure fluid cushions or water taps, the receivers being supplied independently of one another and with a very small pressure drop.

The device essentially comprises a fluid manifold connected with a fluid source and branching out into a plurality of fluid emission nozzles having an outlet opening, and a plurality of fluid-receiving pipes each of which is connected with a corresponding receiver and has an inlet opening located in-line with and spaced by a gap from the outlet opening of a corresponding emission nozzle, the cross-sectional area of said inlet opening of a receiving pipe being at the very most equal to the cross-sectional area of said outlet opening of said corresponding emission nozzle. The inlet opening of each receiving pipe is thus completely filled by the fluid from the corresponding emission nozzle, without any of the ambient fluid being sucked in by induction, in contrast to conventional induction pumps (also called jet pumps, or ejector pumps) having an exhaust duct through which a mixture of injected inducing fluid and ambient induced fluid travels.

Advantageously, each receiving pipe has a sharp-edged inlet opening and a wall which immediately diverges from said inlet opening; this also differs from induction pumps in which the exhaust duct has a rounded inlet and is of convergent-divergent shape.

According to one feature of the invention, the cross-sectional area of the outlet opening of an emission nozzle is substantially equal to the overall area of an outlet for fluid from the corresponding receiver. Preferably, said nozzle outlet opening is located in an environment or medium where the pressure is substantially equal to the ambient pressure at said receiver outlet, so that the outlet conditions for the emission nozzles are identical with the outlet conditions for the receivers.

In one embodiment of the invention, the peripheral area of the gap between the outlet opening of an emission nozzle and the inlet opening of a corresponding receiving pipe is at least equal to the overall outlet area of the corresponding receiver, so that if a receiver is closed, fluid from the corresponding emission nozzle can flow outside the corresponding receiving pipe without interfering with the supply to the other receiving pipes and receivers.

In an alternative embodiment, an emission nozzle is connected to the corresponding receiving pipe by a sleeve formed with orifices having a total cross-sectional area at least equal to the overall outlet area of the corresponding receiver.

According to another embodiment, the emission nozzles and the associated receiving pipes are disposed in a chamber, in-line with orifices formed in the walls of said chamber.

The following exemplary non-limitative description, in conjunction with the accompanying drawings, will clearly show how the invention can be put into effect. In the drawings:

FIG. 1 is a diagrammatic view of a ground-effect machine equipped with a fluid supply device according to the invention;

FIG. 2 is a cross-section on a larger scale, of a fluid supply device according to the invention;

FIG. 3 is a diagrammatic view of a water-distributing installation equipped with a fluid supply device according to the invention;

FIG. 4 is a cross-section of an alternative embodiment of a fluid supply device according to the invention; and FIGS. 5 to 8 are views of another embodiment of a fluid supply device according to the invention, FIG. 5 being a cross-section of the whole assembly; FIG. 6 being a perspective view of part of the assembly; FIG. 7 being a cross-section along line VII—VII of FIG. 6, and FIG. 8 being an axial cross-section on a larger scale of a detail in FIG. 7.

A ground-effect machine shown in FIGS. 1 and 2 has a row of pressure fluid cushions 1 each of which is a fluid-using appliance or "receiver" which uses pressure fluid delivered by a fluid source such as a compressor or fan 2 via a manifold 3. Each cushion 1 has an outlet $8a$ bounded by a free edge $1a$ of the corresponding cushion chamber, and through which cushion fluid escapes in an ambient medium 8. The manifold 3 branches out into a plurality of fluid emission nozzles 4 placed at intervals therealong and each having an outlet opening $4a$. A plurality of fluid receiving pipes 5 is provided, each of which is connected with a corresponding fluid cushion or receiver 1 and has an inlet opening $5a$ located in-line with and spaced by a gap $7a$ from the outlet opening $4a$ of a corresponding fluid emission nozzle 4. The appearance of the assembly is somewhat similar to the system described in U.S. Pat. No. 3,263,764 in which there is described a fluid supply system comprising a plurality of individual inducer nozzles fed with hot gas and which respectively prime elemental eductors separately supplying several fluid-cushions with a mixture of inducing hot gas and induced atmospheric air.

In contrast to the cited specification, however, the fluid emission nozzles 4 and the associated receiving pipes 5 according to the invention have the following distinctive features:

the cross-sectional area of the inlet opening $5a$ of each receiving pipe is not greater and may be less than the cross-sectional area of the outlet opening $4a$ of the corresponding emission nozzle, so that the fluid from said emission nozzle 4 completely fills the associated receiving pipe 5 without any ambient fluid being induced into said receiving pipe;

the inlet opening $5a$ of each receiving pipe 5 has a sharp edge and is not rounded and each receiving pipe is not convergent-divergent but purely divergent immediately from the inlet opening $5a$.

In addition, the fluid emission nozzles 4 terminate in an environment or medium 7 where the pressure is similar to the pressure at the ambient medium 8 of the cushion outlet $8a$, so that the outlet conditions are substantially the same in both cases. The cross-sectional area of the outlet opening $4a$ of each emission nozzle is substantially equal to the overall area of the outlet $8a$ for fluid from the corresponding cushion 1.

Furthermore, the peripheral area of the gap $7a$ separating the outlet opening $4a$ of each emission nozzle 4 from the inlet opening $5a$ of the corresponding receiving pipe 5 is at least equal to the overall area of the said outlet $8a$.

The use in the manner described of the device according to the invention for supplying the fluid cushions of a ground-effect machine is in no way exclusive, and the device can be used for other purposes.

FIG. 3 illustrates the application of the device to a system for distributing water or another liquid, the same reference numbers being used to denote the same elements. A pump 2 delivers liquid into a manifold 3 from which liquid is removed by liquid emission nozzles 4 terminating opposite receiving pipes 5 each of which is provided with a tap or cock 9, each tap controls the liquid flow to the outlet of each receiving pipe. The environment or medium 7 which communicates with the gaps 7a is enclosed in a tank 10 from where the liquid flowing through leaks via said gaps 7a is recovered via duct 11 terminating at the inlet of pump 2, so that said leaking liquid can be recycled.

As in the preceding example, the cross-sectional area of the outlet opening of each emission nozzle 4 is equal to the overall area of the outlet of the corresponding tap 9 and the peripheral area of each gap 7a is at least equal to the overall area of the outlet of the corresponding tap 9 so that, when the tap is closed, liquid from nozzle 4 can flow freely via the periphery of gap 7a without interfering with the supply of the other receiving pipes 5, whose taps 9 may be opened.

In the variant embodiment shown in FIG. 4, the fluid emission nozzle 4 and the associated receiving pipe 5 are interconnected by a sleeve 12 formed with orifices 13 having a total cross-sectional area which, as before, is at least equal to the overall area of the outlet for fluid from the corresponding receiver.

FIGS. 5 – 8 show a system of coupled emission nozzles and receiving pipes 4-12-5 of the aforementioned kind, denoted by the general reference number 14 and connected in parallel between a perforated inlet plate 15 and a perforated outlet plate 16 and in-line with the peforations in said plates.

The plates 15 and 16 together bound a chamber which is connected by a vent 17 to atmosphere and which communicates with the interior of the connecting sleeves 12 via orifices 13.

The manifold 3 communicates with the "couples" 14 via the perforated plate 15, whereas the receivers (not shown) are connected to said couples via the perforated plate 16.

This system provides a very efficient silencer of the expansion chamber type, of reduced dimensions owing to the high flow speed of the fluid through said system.

Having thus described the invention, what is claimed as new and useful and desired to be secured by U.S. Letters Patent is:

1. In and for an installation comprising a fluid source and a plurality of fluid receiving pipes to be fed with fluid from said source, a device for supplying fluid from said source to said pipes independently of one another, said device comprising a fluid manifold connected with said fluid source and branching out into a plurality of fluid emission nozzles each having an outlet opening, said plurality of fluid-receiving pipes each having an inlet opening located in line with and spaced by a gap from the outlet opening of a corresponding emission nozzle, said gaps comprising means permitting excess fluid to overflow to a common volume, the cross-sectional area of said inlet opening of a receiving pipe being at the very most equal to the cross-sectional area of said outlet opening of said corresponding emission nozzle.

2. A device as claimed in claim 1, wherein each receiving pipe has a sharp-edged inlet opening and a wall which immediately diverges from said inlet opening.

3. A device as claimed in claim 1, wherein each emission nozzle has its outlet opening located in a medium where the pressure is substantially equal to the ambient pressure at an outlet for fluid from said receiving pipe.

4. A device as claimed in claim 1, wherein the peripheral area of said gap between the outlet opening of an emission nozzle and the inlet opening of a corresponding receiving pipe is at least equal to the overall area of an outlet for fluid from said receiving pipe.

5. A device as claimed in claim 1, wherein the outlet opening of an emission nozzle is connected to the inlet opening of a corresponding receiving pipe by a sleeve formed with orifices whose total cross-sectional area is at least equal to the overall area of an outlet for fluid from said receiving pipe.

6. A device as claimed in claim 1, further comprising a chamber bounded in part by two walls formed with orifices, wherein said emission nozzles and associated receiving pipes are disposed within said chamber, in line with said orifices, said chamber further including venting means.

7. A device as claimed in claim 1, wherein each fluid receiving pipe is connected to a corresponding receiver.

8. A device as claimed in claim 7, wherein the cross-sectional area of the outlet opening of an emission nozzle is substantially equal to the overall area of an outlet for fluid from the corresponding receiver.

9. A device as claimed in claim 1, wherein said volume is unbounded.

* * * * *